Aug. 4, 1936.   H. B. KRAFT   2,050,101
BRAKE TESTING APPARATUS
Filed April 23, 1928
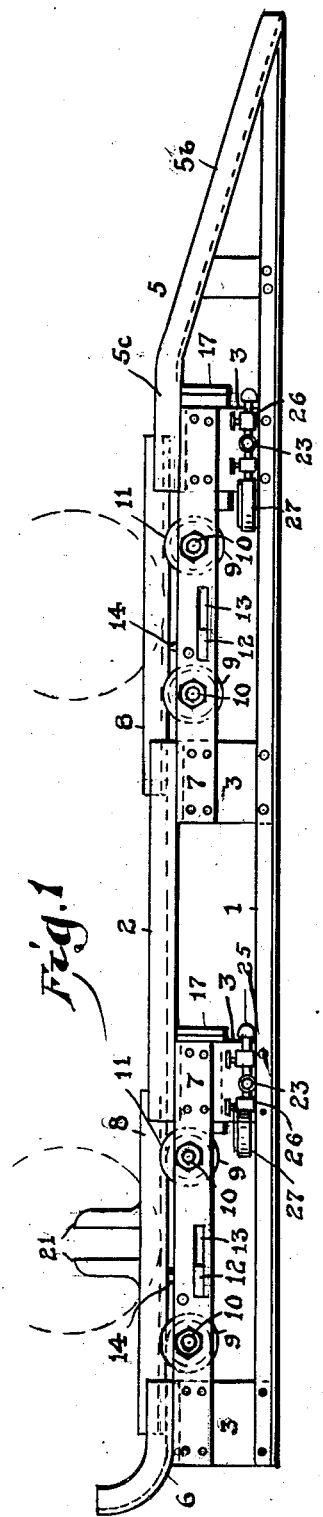
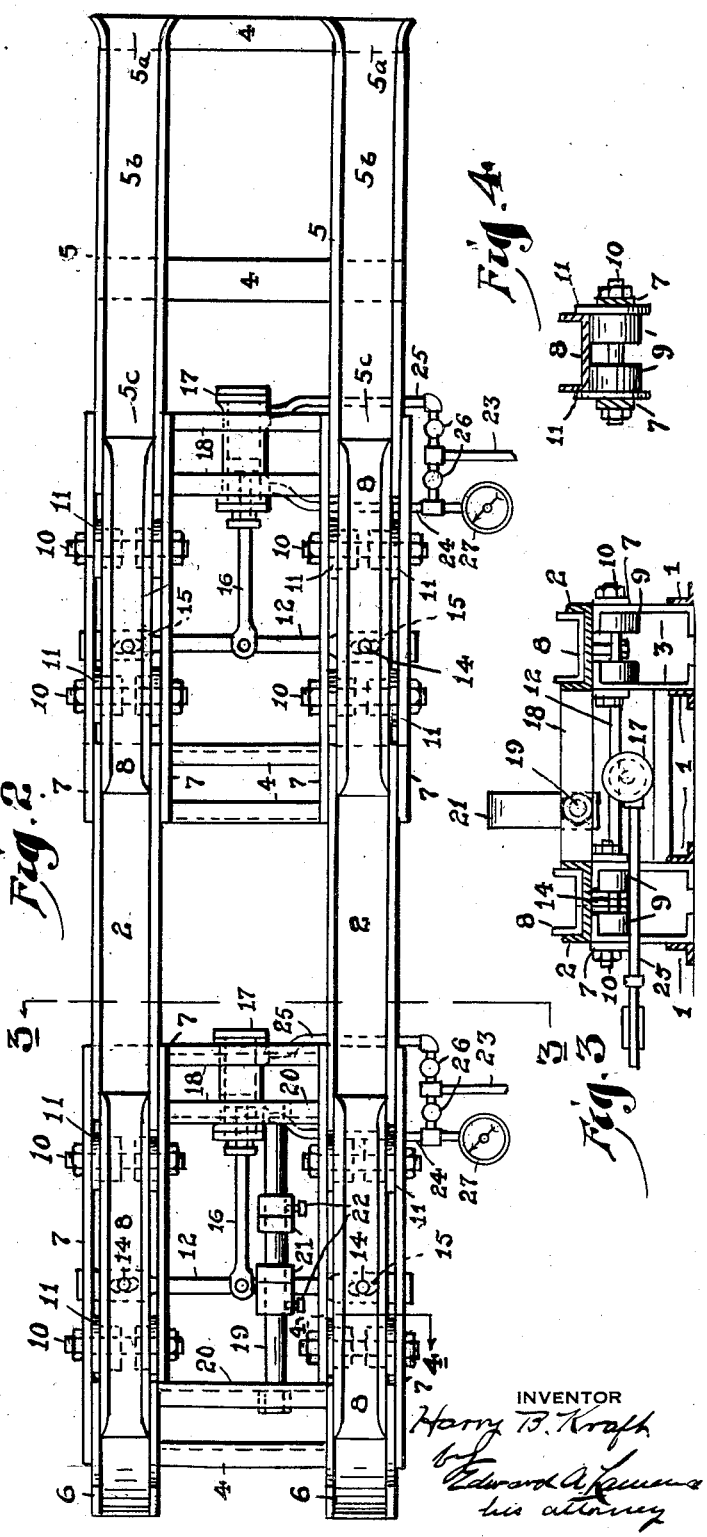
INVENTOR
Harry B. Kraft
by Edward A. Lummus
his attorney Patented Aug. 4, 1936

2,050,101

UNITED STATES PATENT OFFICE 2,050,101

BRAKE TESTING APPARATUS

Harry B. Kraft, Sharon, Pa., assignor, by mesne assignments, to Bendix Cowdrey Brake Tester, Inc., a corporation of Delaware Application April 23, 1928, Serial No. 272,090

15 Claims. (Cl. 265—47)

For the safe operation of automobiles and other power-driven vehicles, especially those provided with four wheel brakes, it is very important that when the brakes are applied that they be applied with substantially equal braking force on all the wheels which are provided with brakes. Otherwise the vehicle tends to skid or swerve when the brakes are applied, and this dangerous tendency is greatly magnified when the brakes are quickly applied as in an emergency or when the road surface is slippery or sandy.

The proper measurement and adjustment of the braking force is a difficult matter and what might seem to be an inconsequential difference may have a very appreciable influence on the action of the brakes.

Various characters of brake testing mechanisms have been designed, and the object of my present invention is to improve the design, structure and operation of such apparatus.

Thus Letters Patent of the United States No. 1,601,739 was issued to me on October 5th, 1926, for Brake testing apparatus by means of which the action of the brakes on individual wheels may be tested for the purpose of adjustment and connection.

In my present invention I provide apparatus for the same general purpose but which enables one to test the different brake resistances offered by a plurality of vehicle wheels seriatim and do this automatically in succession and to indicate to the operator the different brake resistances.

Thus the braking action on the two rear wheels or the two front wheels of a vehicle or of the four wheels may be tested and compared for the purpose of regulating and equalizing the same.

By means of these improvements the operation of testing the brakes of a vehicle is greatly simplified and expedited, so that tests may be made at proper and frequent intervals to assure safety and efficiency.

Other objects will appear from the following description.

In the accompanying drawing, wherein I have illustrated a practical embodiment of the principles of my invention, Fig. 1 is a side elevation of the brake testing apparatus, the vehicle wheels being indicated by dotted circles.

Fig. 2 is a plan view of the apparatus.

Fig. 3 is a view in transverse section taken along the line 3—3 in Fig. 2.

Fig. 4 is a detail view in transverse section taken along the line 4—4 in Fig. 2.

Referring to the drawing, I indicates the longitudinal bed girders of the apparatus preferably of channel shape and arranged in parallel pairs with their horizontal flanges turned outwardly as shown in Fig. 3.

2 indicates the intermediate fixed track members, preferably of channel shape and supported adjacent to their ends from the girders 1 as by the pairs of channel plates 3 vertically arranged in pairs with their flanges turned toward each other as illustrated in Fig. 3.

The girders 1 are connected together by cross braces 4 at suitable intervals.

5 indicates the fixed entrance track members, also of channel shape and having their outer ends provided with flared enlargements 5a to facilitate the driving of a vehicle thereon.

The track members 5 comprise upward and rearward inclined entrance portions 5b and horizontal rear portions 5c.

The front ends of the track members 5 are secured to the girders 1 and the front cross brace 4, the girders being caused to diverge to receive the flared end of the track members.

At the merger of the inclined portions 5b and the horizontal portions 5c the track members 5 are supported from the girders 1 by the channel plates 3 and the rear ends of said track members 5 are similarly supported. The track members 5 are alined with the track members 2 and the adjacent ends of said track members are spaced apart for a suitable distance.

At the other or front end of the apparatus I provide a pair of fixed track members 6 which are likewise supported from the girders 1 by channel plates 3.

The outer ends of the track members 6 are preferably curved upwardly as shown to prevent a vehicle accidentally traveling off the rear of the apparatus.

The track members 6 are alined with the track members 2 and have their adjacent ends spaced away therefrom for a suitable distance.

Spanning the spaces between the adjacent ends of the track members 2 and 5 but below the same are the connecting bars 7 which are attached to the exterior of the brackets 3.

Similar bars 7 span the spaces between the track members 2 and 6.

8 represents wheel-driving devices each one adapted to engage and rotate a separate wheel of the vehicle and which, when also utilized to support the weight of the vehicle, I have called chairs, four in number, and which are relatively short lengths of channel plates whose ends telescope within the ends of the track members 2 and 5, and likewise the track members 2 and 6, thus bridging the spaces between the alined track members.

The end portion of said chairs having sliding contact with the tread surfaces of the fixed track members and the chairs are also supported on the pairs of rollers 9 which are rotatably mounted on axles 10 which are positioned transversely of the apparatus and are supported by the connecting bars 7. The rollers are provided with flanges 11 which hold the chairs properly alined therein. Each chair is supported on two pairs of rollers.

The wheel-driving devices such as 8—8 of any one pair of wheels are connected by mechanism which when the proper force is applied thereto will move them and thereby rotate the wheels successively and independently and so that the wheel having the least brake resistance will first move and then be arrested. On a sufficient increase of force applied the effective force will then be automatically applied to the other wheel. In other words the wheels are moved successively at times inversely to their brake resistances. This enables a single source of power for a plurality of wheels to be used, together with, if desired, a single indicating device which will show the operator the successive brake resistances exerted by the different wheels. In the present preferred embodiment of my invention illustrated in the drawing and described herein, I have provided a simple and inexpensive construction for accomplishing the above results. The chairs of each pair are connected together by the equalizer-bar 12 whose ends are slidably supported in horizontal slots 13 in the connecting bars 7 and the connection between the chairs and the equalizer-bar is such to permit the latter to have an angular movement relative to the chairs. Thus I have shown a kingbolt 14 depending from each chair and engaging a hole 15 in the equalizer-bar which hole is slotted or elongated longitudinally of the equalizer-bar.

A source of power is provided for moving the wheel-driving devices, and in the present embodiment of my invention I have made use of a fluid pressure construction, which is what I now prefer. At its center each of the equalizer-bars 12 is pivotally attached to the end of a piston rod 16 of the piston of a fluid-pressure cylinder 17 which is mounted on the transversely disposed supporting members 18 having their ends secured at their ends to the adjacent channel plates 3.

The arrangement is such that the retraction of the piston rods causes the chairs connected thereto to be moved toward the entrance end of the apparatus and the extension of said piston rods causes the chairs to move toward the opposite end of the apparatus. As each end of the equalizer bar with its wheel-driving device 8, is free to move, that one which exerts the least resistance because its wheel brake exerts the lesser resistance, will first move, the other one, because of its greater resistance, acting as an anchor or fulcrum so long as it exerts the greater resistance, but if the one first to move encounters a sufficiently greater resistance than the anchored end conditions will be reversed and the one which formerly operated as the anchor will move because it then exerts the lesser resistance to the force applied.

Between the front chairs a shaft 19 is fixed longitudinally of the apparatus, having its end secured to cross members 20 whose ends are secured to the adjacent channel plates 3.

Upon the shaft 19 are adjustably mounted a pair of fingers 21 which have hubs encircling the shaft and which may be fixed in position, as shown in Fig. 2, by means of set screws 22 to hold between them the front axle of a vehicle to prevent its movement relative to the apparatus. The above constitutes a simple embodiment of a vehicle-holding arrangement which I now prefer, but it will be obvious that other means for holding the vehicle in place may be provided if desired.

When a fluid-pressure source of power is used, compressed air at proper pressure may be supplied to the cylinders 17 from pressure supply pipes 23 which have branches 24 and 25 which are connected to the front and rear ends of the cylinder, respectively, and each of said branch pipes is provided with a three-way valve 26 so that fluid pressure may be either shut off from the corresponding end of the cylinder, admitted thereto or relieved therefrom.

The branch pipe 24 connected to the front end of each cylinder is provided with a conveniently located pressure gauge 27.

The vehicle is run up onto the apparatus and halted with its wheels supported, in the present embodiment, by the four chairs 8, and the fingers 21 are adjusted and fixed to grasp the front axle and hold the vehicle against movement relative to the apparatus.

By the proper adjustment of the pairs of valves 26 connected up with the two cylinders, pressure is admitted to the front end of the cylinders and relieved from the rear ends of the latter, thus, applying force to the chairs tending to move the same rearwardly. Sufficient pressure is admitted to the front end of the cylinder to cause chairs to rotate the wheels.

It is evident that if the two chairs upon which the front or the rear wheels of the vehicle are mounted move in unison, it indicates that the brakes are uniformly adjusted on the two wheels and the pressure required to rotate the wheels with the brakes applied is noted on the dial. If the pressure is excessive the brakes may be loosened to the proper degree, and if the dial shows that the brakes need tightening, the correction may be made.

In case the brakes on the two front or rear wheels are unevenly applied, the chair under the wheel to which the brakes are less tightly applied will move while the other chair will remain stationary, the pivotal and pin and slot connection of the equalizer-bar permitting the latter to tilt.

The pressure required to rotate the wheel on the moved chair is then noted.

It will be obvious that the more tightly applied brake, or rather the wheel-driving device 8 to which the greater brake resistance is applied, will act as a sort of fulcrum for its end of the equalizer-bar 12, and, if the chair or other wheel-driving device 8 of the first moving wheel could move continuously, the more heavily braked wheel would not move at all. Some automatic stop or arresting mechanism should therefore be provided in order to cause the force to drive the more heavily braked wheel. However, the movement of the corresponding end of the equalizer-bar is limited by contact with the end of the guide slot 13, which thus operates as a stop or arresting device for that end of the lever, so that the further pull of the piston rod will be exerted on the other chair which has hitherto remained stationary because, as its wheel is more heavily braked, it exerts a greater resistance to the force applied. When the force is increased sufficiently the lever will move about the end of the slot operating as a fulcrum and consequently move the chair and wheel which is more heavily braked.

It will be observed that the wheels are moved successively and automatically at times inversely to their brake resistances. The successive forces required to move the two wheels will be successively indicated on the gauge because, as soon as the least heavily braked wheel moves, the pointer of the gauge will stop and will remain stationary until the end of the lever moves a sufficient distance to come against the end of its slot, which will indicate roughly the brake resistance of that wheel. Then as the pressure is increased until the brake resistance of the other wheel is overcome the gauge will indicate this greater resistance of that wheel brake.

The brakes may then be released and pressure applied to the rear and relieved from the front end of the cylinder to move the chairs back to their original positions. The brakes are then adjusted and the test repeated.

The brakes of both sets of wheels are similarly tested and adjusted to substantially uniform tightness.

It is evident that the testing and adjustment of the brakes of a vehicle may be much more accurately, conveniently and expeditiously accomplished by the use of my present invention than is possible where the wheels are individually tested in relation to a predetermined pressure.

I am aware that my invention may be embodied in various forms and I therefore do not limit myself to the specific embodiment shown in the drawing, which however as it is so efficient and inexpensive, is the one I now prefer.

What I desire to claim is:—

1. In a brake testing apparatus, the combination of a pair of chairs upon which the opposed wheels of a vehicle, with the brakes set, are supported, said chairs being arranged for movement in parallel paths and at right angles to the axes of said wheels whereby to revolve the wheels against the influence of the brakes, a power-means for moving said chairs, and operative connection between said power-means and said chairs including a lever having its ends connected to the chairs and its intermediate portion connected to said power-means, said lever being arranged to swing to permit the chair supporting the less effectively braked wheel to be first moved.

2. In a brake testing apparatus, the combination of a pair of chairs upon which the opposed wheels of a vehicle, with the brakes set, are supported, said chairs being arranged for sliding in parallel paths and at right angles to the axes of said wheels whereby to revolve the wheels against the influence of the brakes, means for moving said chairs, said means comprising a prime mover and a lever connection between the same and both of said chairs, means arranged to indicate the force required to move the chairs, and means for holding the vehicle against movement with the chairs.

3. In a brake testing apparatus, the combination of a pair of parallel trackways, two pairs of opposed chairs interposed in said trackways and movable in line therewith, said chairs being arranged to support the four wheels of a vehicle with the brakes set, two power means, lever connection between each of said power means and each pair of chairs, said lever connection being arranged to permit the chairs of a pair to move individually in accordance with their respective resistance to movement and means for indicating the force required to move the chairs.

4. In a brake-testing apparatus, the combination of a pair of chairs upon which the opposed wheels of a vehicle, with the brakes set, are supported, said chairs being arranged for movement in parallel paths, a prime mover, operative connection between said prime mover and said chairs to move the latter, said connection comprising a lever connected at its opposite ends to the individual chairs and at an intermediate point to the prime mover whereby the lever swings as the wheel less effectively braked is caused to rotate, and means to limit the swinging movement of the lever whereby to cause the force to be applied to rotate the other wheel.

5. In a brake-testing apparatus, the combination of a pair of chairs upon which the opposed wheels of a vehicle, with the brakes set, are supported, said chairs being arranged for movement in parallel paths, a prime mover, operative connection between said prime mover and said chairs to move the latter, said connection comprising a lever having a pivotal connection at its opposite ends to the individual chairs and at its center to the prime mover whereby the lever swings as the wheel less effectively braked is caused to rotate, and means to limit the swing of the lever whereby to cause the force to be applied to rotate the other wheel.

6. In a brake-testing mechanism for vehicles in combination, a pair of independently-movable wheel-driving devices each adapted to engage one of a pair of opposite braked wheels of the vehicle, power-driven means connected to said devices and adapted to transmit the force to them so as to move them and thereby rotate the wheels and including differential mechanism, arresting means, and means movable with said devices to engage the arresting means after a given movement of the device first to move to arrest its movement and thereby cause said wheel driving devices to move successively at times depending on their resistances to the force applied.

7. In a brake-testing mechanism for vehicles in combination, a pair of independently-movable wheel-driving devices each adapted to engage one of a pair of opposite braked wheels of the vehicle, power-driven means connected to said devices and adapted to transmit the force to them so as to move them and thereby rotate the wheels and including a differentially-acting lever, together with a stop, and means movable with the devices to engage said stop to arrest movement of the device first to move after a given movement, thereby causing the force applied to shift the other device.

8. In a brake-testing mechanism for vehicles in combination, a pair of independently-movable wheel-driving devices each adapted to engage one of a pair of opposite braked wheels of the vehicle, a common source of power, connections therefrom to both said wheel-driving devices, arresting means, and means movable with said devices to cooperate with the arresting means after a given movement of the device first to move to arrest its movement and thereby cause said wheel driving devices to move successively at times depending on their resistances to the force applied.

9. In a brake testing apparatus, the combination of a pair of supports upon which the opposed wheels of a vehicle with the brakes set may be supported, said supports being movable in parallel paths to turn the wheels against the action of the brakes, a force applying member connected to both of the supports, means for applying force to said member to move it with the supports, said member being also arranged to move angularly to the paths of the supports in response to an inequality in the resistances of the supports to movement, and means to indicate in succession the forces required to move the individual supports.

10. In a brake testing apparatus, the combination of a pair of supports upon which the opposed wheels of a vehicle with the brakes set may be supported, said supports being movable in parallel paths to turn the wheels against the action of the brakes, a force applying member having its ends connected to the supports, means for applying force to said member intermediate its ends, the end connections of said member being arranged to permit the member to tilt in response to an inequality in the resistance of the supports to movement, and means to indicate the force required to move the member.

11. In a brake testing apparatus, the combination of a pair of supports upon which the opposed wheels of a vehicle with the brakes set may be supported, said supports being movable in parallel paths, means to move said supports to turn the wheels against the influence of the brakes, said means including a prime mover and a lever connection between the same and both of said supports, and means for indicating the force required to move the individual supports and thus the resistance of the individual brakes.

12. In a brake testing apparatus, the combination of a pair of supports upon which the opposed wheels of a vehicle with the brakes set may be supported, said supports being movable in parallel paths to turn the wheels against the action of the brakes, power driven means connected to said supports and adapted to transmit the force to move them to turn the wheels including differential mechanism, arresting means, means movable with the support first to move to coact with said arresting means to stop movement of this support and cause movement of the other support, and means for indicating the force applied.

13. In a brake testing apparatus, the combination of a pair of independently movable supports upon which the opposed wheels of a vehicle with the brakes set may be supported, power driven means connected to said supports and adapted to transmit force to move the supports and thereby turn the wheels against the action of the brakes, arresting means, and means movable with said supports cooperating with said arresting means on a given movement of the support first to move to arrest this movement and cause the force to move the other support.

14. In a brake testing apparatus, the combination of a pair of independently movable supports upon which the opposed wheels of a vehicle with the brakes set may be supported, power driven means connected to said supports and adapted to transmit force to move the supports and thereby turn the wheels against the action of the brakes and including a differentially acting lever connected to the two supports, and a stop to arrest movement of the end of the lever first to move after a given movement and thereby cause the force applied to move the other support.

15. In a brake testing apparatus, the combination of a pair of independently movable supports upon which the opposed wheels of a vehicle with the brakes set may be supported, a common source of power, connections therefrom to both said wheel supports, arresting means, means movable with said supports to cooperate with the arresting means after a given movement of the support first to move to arrest its movement and thereby cause said supports to move successively at times inversely as their resistances to the force applied, and means for indicating the force applied.

HARRY B. KRAFT.